United States Patent [19]
Onnenberg et al.

[11] Patent Number: 4,895,686
[45] Date of Patent: Jan. 23, 1990

[54] PROCESS FOR THE PRODUCTION OF CUSHIONS MADE OF FOAM WHICH ARE PROVIDED WITH TEXTILE COVERS

[75] Inventors: Volker Onnenberg, Drabenderhoehe; Ralf Busch, Cologne, both of Fed. Rep. of Germany; John Lindsey, Pittsburgh, Pa.

[73] Assignee: Bayer Aktiengesellschaft, Bayerwerk, Fed. Rep. of Germany

[21] Appl. No.: 278,624

[22] Filed: Dec. 1, 1988

Related U.S. Application Data

[62] Division of Ser. No. 65,793, Jun. 24, 1987.

[30] Foreign Application Priority Data

Jul. 9, 1986 [DE] Fed. Rep. of Germany ....... 3622951

[51] Int. Cl.⁴ ...................... B29C 67/22; B29C 51/10
[52] U.S. Cl. .................... 264/46.6; 264/46.8; 264/511
[58] Field of Search ...................... 264/46.8, 511, 553, 264/46.6

[56] References Cited

U.S. PATENT DOCUMENTS

| | | | |
|---|---|---|---|
| 3,377,103 | 4/1968 | Borton et al. | 297/453 |
| 4,115,170 | 9/1978 | Sanson | 264/46.8 |
| 4,323,406 | 4/1982 | Morello | 264/46.4 |
| 4,780,263 | 10/1988 | Atkin et al. | 264/46.6 |

FOREIGN PATENT DOCUMENTS

| | | |
|---|---|---|
| 2746686 | 4/1979 | Fed. Rep. of Germany . |
| 3613879 | 1/1987 | Fed. Rep. of Germany . |
| 3610128 | 5/1987 | Fed. Rep. of Germany . |
| 2572015 | 4/1986 | France . |
| 55-107436 | 8/1980 | Japan .................................. 264/46.8 |
| 62-009942 | 1/1987 | Japan .................................. 264/46.8 |
| 62-038192 | 2/1987 | Japan .................................. 264/46.8 |

*Primary Examiner*—Jan H. Silbaugh
*Assistant Examiner*—Allan R. Kuhns
*Attorney, Agent, or Firm*—Joseph C. Gil; Thomas W. Roy

[57] ABSTRACT

A process for the production of foam cushions having textile covers by inserting a textile cover into a mold cavity having gates which project into the mold cavity, initially preforming the textile cover by applying a vacuum through holes in the mold cavity such that the textile cover conforms to the contour on both sides of the gates, clamping the textile cover against the gates, optionally further positioning the textile cover such that it conforms to the contours of both the gates and the mold cavity, releasing the clamps and introducing a foam-forming reaction mixture into the mold cavity. The present invention is also directed to a form tool having gates, means for applying a vacuum through holes in the mold cavity in gates and clamping means for clamping the mold cover to the gates.

4 Claims, 2 Drawing Sheets

PROCESS FOR THE PRODUCTION OF CUSHIONS MADE OF FOAM WHICH ARE PROVIDED WITH TEXTILE COVERS

This application is a division of application Ser. No. 07/065,793 filed June 24, 1987, now U.S. Pat. No. 4,808,100.

BACKGROUND OF THE INVENTION

1. Field of the Invention

The invention is directed to a process and a form tool for the production of foam cushions which are provided with textile covers. In this process the textile cover is inserted into a mold cavity and placed against the mold cavity side in conformity with the contour by the use of a vacuum and against gates which project into the mold cavity before a foam-forming reaction mixture is added.

2. Description of the Prior Art

A method of positioning the textile cover in a vacuum form tool by hand, optionally with the aid of a clamping frame, is known. In this process it has proved to be extremely difficult to make the cover rest against gates which are arranged in the mold cavity in conformity with the contour. It is very time-consuming to carry this out by hand. Therefore, attempts have already been made to simplify and speed up this process using what is termed a "top ram" which is intended to push the cover into the mold cavity. The top ram must, however, fit fairly exactly into the mold cavity, with interposition of the cover. If the top ram is displaced when it is introduced the danger that the cover could be damaged arises. If creases develop in the cover during the impression process these do not become noticeable to the service personnel until after the top ram have been withdrawn. Frequently, however, because the top ram fits exactly, the cover has already been damaged. Finally, the top ram also constitutes a source of danger to the service personnel during handling.

It is an object of the present invention to provide a process and a form tool such that the textile cover also sits against gates which are situated in the mold cavity in conformity with the contour. It is a further object to carry out this process rapidly and without any danger to the service personnel. This object may be achieved in accordance with the present invention.

SUMMARY OF THE INVENTION

The present invention is directed to a process for the production of foam cushions having textile covers by inserting a textile cover into a mold cavity having gates which project into the mold cavity, initially preforming the textile cover by applying a vacuum through holes in the mold cavity such that the textile cover conforms to the contour on both side of the gates, clamping the textile cover against the gates, optionally further positioning the textile cover such that it conforms to the contours of both the gates and the mold cavity, releasing the clamps and introducing a foam-forming reaction mixture into the mold cavity.

The present invention is also directed to a form tool for the production of foam cushions having a textile cover wherein the form tool is made up of a mold cavity having gates for altering the shape of articles molded in the mold cavity, a vacuum for applying a vacuum to the mold cavity through holes in the mold cavity or the gates and a clamping device to be used in conjunction with the gates, the clamping device having clamps for clamping the textile cover to the gates.

DETAILED DESCRIPTION OF THE INVENTION

Figure 1:
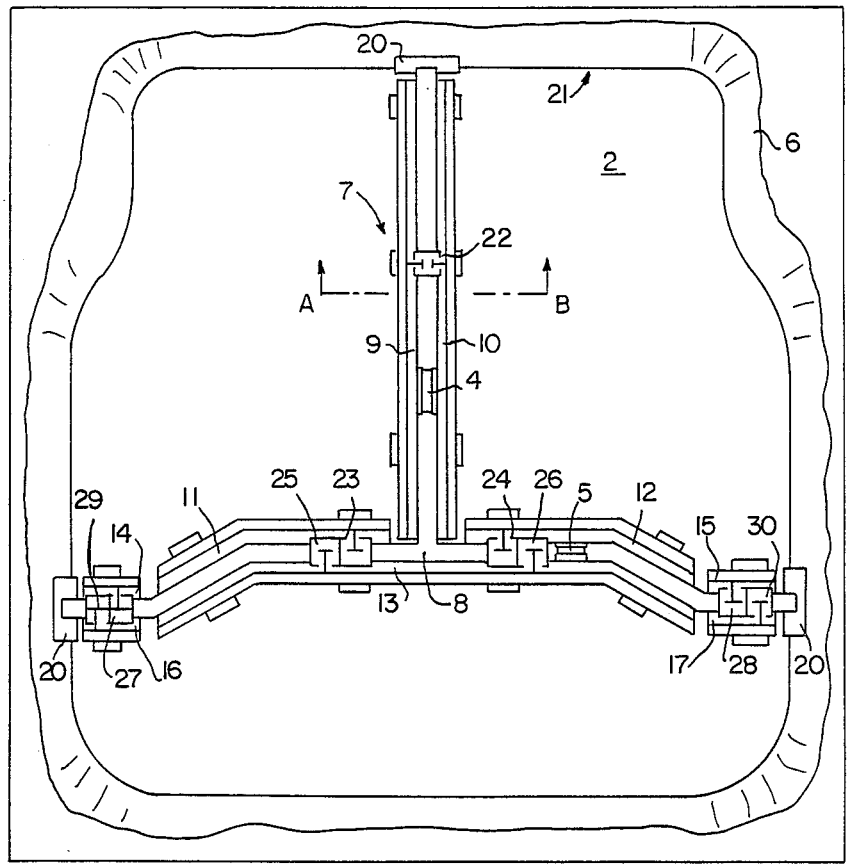
FIG. 1 is a top view of the mold cavity of an open form tool with an inserted clamping device.
Figure 2:
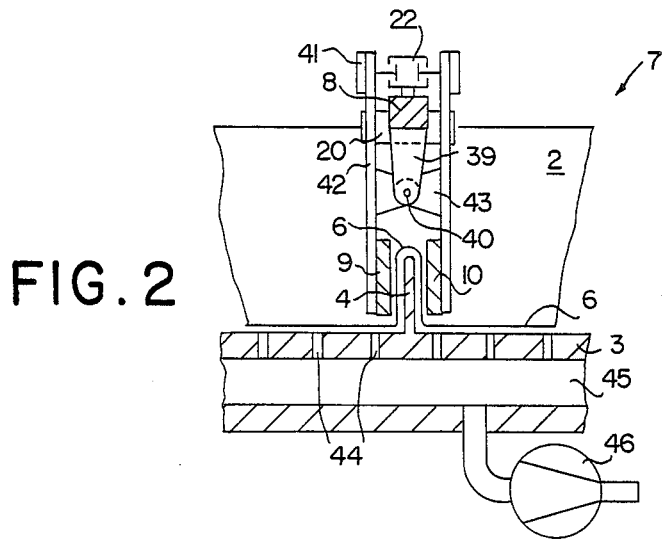
FIG. 2 is a section view through the clamping device following line 1—1 in FIG. 1.

In accordance with the present invention service personnel can observe the clamping process and, when necessary, interrupt the process and repeat it immediately if the textile cover slips or if undesirable faults develop. Therefore, the possibility that the cover will be damaged during relatively careful handling is markedly reduced. The new process may also be carried out automatically. The clamping effect can be applied mechanically, pneumatically, hydraulically or even electromagnetically. As is customary a clamping frame can additionally be used, which allows further local positioning of the cover due to local adjustment of the contact pressure.

According to one particular embodiment of the process, if several gates are present, the cover is initially clamped firmly to the centrally situated gate(s) and only then firmly clamped to the other gates, progressing towards the outside, in which process the cover is tightened, if necessary, between each of the clamping processes.

In this manner it is ensured that the cover is uniformly taut in all parts. If too much material is present it can be pushed away to the outside; if there is too little it can be drawn from the outside towards the inside. In this manner both the development of creases is avoided and the material is prevented from becoming overly stretched.

In particular cases it can also be advisable, if the geometry of the cushion to be produced is appropriate, to begin with the clamping of the cover firmly onto the gates on one side of the mold cavity, and then progress to the other side.

Preferably the cover is initially clamped against one side of the gate and then clamped against the other side, while the initial clamping effect is maintained; this process can be staggered over time. This measure, too, promotes the taut positioning of the cover, free of creases, in the mold cavity. It is thus possible to program the sequence of the clamping process, with the setting of an optimal sequence that corresponds to the given geometry in each case.

The form tool for the production of cushions made of foam having textile covers emanates from a mold cavity with gates arranged in it wherein the side of the mold cavity and/or the gates have holes which are connected to a vacuum source. In accordance with the present invention a clamping device is provided having clamping jaws which act against the gates.

In contrast to the use of a top ram, a clamping device of this nature has the particular advantage that service personnel can observe the clamping process and act immediately in cases of breakdown. The servicing of the clamping device is far less dangerous than when a top ram is used. In addition, the clamping process is far less expensive in terms of energy since there is less friction than when a top ram is used.

The clamping jaws preferably operate in pairs. In this process it is advisable for at least one pair of clamping jaws which point to each other to be allocated to each gate. In this way the clamping jaws for each gate can be operated at an appropriate time.

According to another particular embodiment the operation of the various clamping jaws can be staggered over time. This means (provided the operation is not triggered by hand) time lag relays are provided in the triggering mechanism of a control device. If one of the clamping jaws of a clamping jaw pair act independently, it must be possible for the clamping device to support itself in some manner in order that the first clamping jaw can exert pressure. After the cover has been repositioned, as required, the second clamping jaw can be operated. The staggered operation can thus be applied not only to pairs of clamping jaws but also quite generally, to all clamping jaws individually.

In order to enable the possibilities described above to be used to their best advantage, a control device is used in conjunction with the clamping device.

A program is fed into this control device which guarantees an optimal sequence of the positioning process of the cover in the mold cavity on the basis of trials. The control device may include pulse generators which activate the different clamping jaws one after the other in the prescribed sequence. Intervals in the clamping sequence may be used such that the cover can settle after each individual clamping process and, if necessary, be straightened before the next clamping process begins. An interrupter switch may also be provided so that the service personnel can interrupt the program sequence at any time.

It is possible to allocate to each gate its own clamping device or one common clamping device to several or all gates. The embodiment which is selected depends principally on the given geometry of the cushion which is to be produced.

It is particularly advantageous if the clamping device can be provided with centering buffers. Since the clamping device must in any case have a supporting frame for the clamping jaws it is very simple to add centering buffers to the supporting frame in such a way that the latter are supported with the interposition of the cover at the edge of the mold cavity or at other suitable centering points. The service personnel are thus saved the laborious straightening of the clamping device by hand.

It is self-evident that the form tool can be positioned on a form tool support and the clamping device can accordingly be arranged so that it can be introduced over the form tool such that the process of the lodging and the removal of the clamping device from the form tool can be made fully automatic.

Preferably a form ram is allocated to the form tool. Creases can be smoothed with this form ram and the cover can be pressed against undercuts where the suction power of the vacuum is insufficient. It can be operated by hand, but it can preferably be controlled by means of a device which works, for example, hydraulically or pneumatically.

Finally it is also possible for the gates to be arranged in the mold cavity so that they can be moved in and out or so that they can be tilted within it. These measures, too, promote the improved contour accuracy of the cover.

In the drawing the new form tool is represented purely diagrammatically in an embodiment example and subsequently explained in greater detail.

Figure 3:
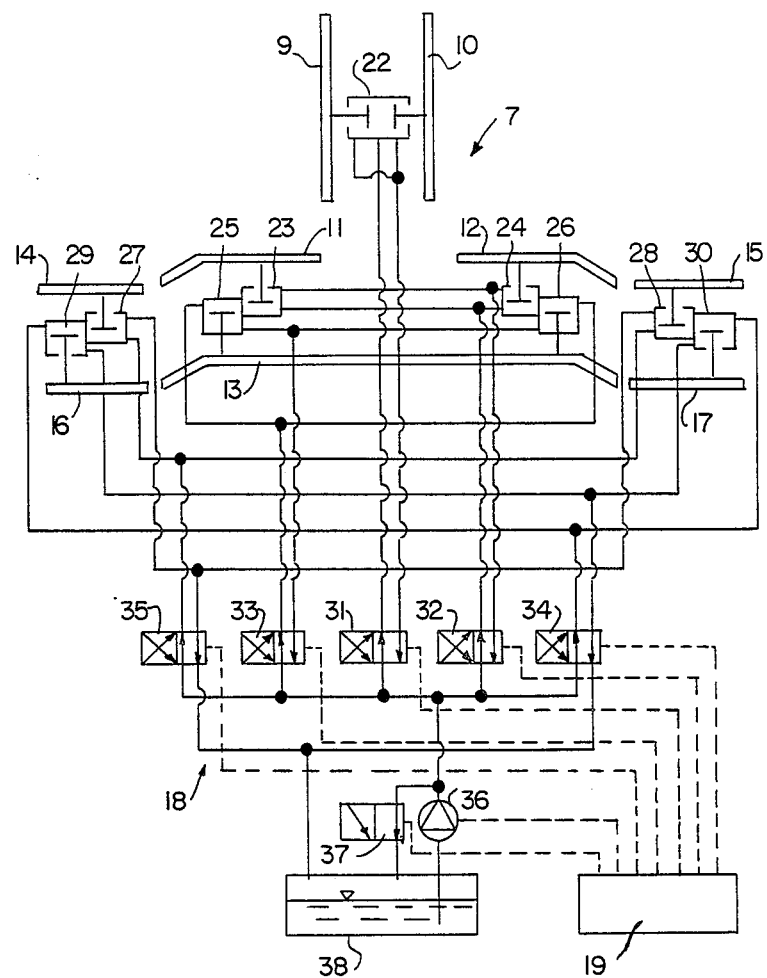
FIG. 3 is the connection diagram for the hydraulic operation of the clamping device according to FIG. 1.

The separate representation of the connection diagram according to FIG. 3 ensures greater clarity, both in FIG. 1 and in FIG. 3, than if both were to be represented in a single figure.

Form tool 1 has a mold cavity 2 on the floor 3 of which gates 4, 5 are arranged. A textile cover 6 is inserted into mold cavity 2. A clamping frame which ensures the intended subsequent sliding of cover 6 is not represented. In mold cavity 2 a clamping device 7 is placed on top of textile cover 6. This is made up of a support frame 8, clamping jaws 9, 10, 11, 12, 13, 14, 15, 16, 17, a hydraulic system 18 and a control device 19. Support frame 8 has centering buffers 20 which are supported with the interposition of cover 6 at edge 21 of mold cavity 2. Hydraulic piston cylinder units 22, 23, 24, 25, 26, 27, 28, 29, 30 are arranged on supporting frame 8. Piston cylinder unit 22 is allocated to gate 4 by means of clamping jaws 9, 10. This is a cylinder with two symmetrically arranged pistons which can be activated at the same time. By means of clamping jaws 11, 12 piston cylinder units 23, 24 which work in parallel and, by means of clamping jaw 13, piston units 25, 26 which work in parallel are allocated to gate 5. By means of clamping jaws 14, 15 and by means of clamping jaws 16, 17, piston cylinder units 27, 28 which work in parallel and piston cylinder units 29, 30 which work in parallel are allocated to the outer sections of gate 5. These piston cylinder units 22, 23, 24, 25, 26, 27, 28, 29, 30 are connected to a hydraulic reservoir 38 by means of the hydraulic pipes which can be seen in FIG. 3, by means of reversing valves 31, 32, 33, 34, 35, and a hydraulic pump 36 to which a return valve 37 is allocated. Reversing valves 31, 32, 33, 34, 35 and return valve 37 and hydraulic pump 32 are connected with control device 19. Clamping jaws 9, 10, 11, 12, 13, 14, 15, 16, 17 are fixed to support frame 8 in the following manner:

On support frame 8 bearing necks 39 are arranged, which bearing necks have an arbor 40. Piston cylinder units 22, 23, 24, 25, 26, 27, 28, 29, 30 act against plates 41 which are connected with the actual clamping jaws 9, 10, 11, 12, 13, 14, 15, 16, 17 by stays 42. Stays 42 are provided with bearing necks 43 which bearing necks also encircle arbor 40. In the floor 3 of mold cavity 2 holes 44 are arranged and connect to a vacuum source 46 via an inlet chamber 45.

The sequence of the operations in the procedure for the production of a cushion with textile cover with the vacuum form tool represented in the drawing and described above is as follows:

A textile cover 6 is inserted into mold cavity 2 of form tool 1, fixed by means of clamping frames and adapted roughly to the contour of mold cavity 2 and gates 4, 5 by means of a vacuum. After that the clamping device 7 is positioned using centering buffers 20 which support themselves on edge 21 of form tool 2. Then, the program is initiated and control device 19 gives hydraulic pump 36 the command to operate. Initially it conveys back into reservoir 38 via return valve 37 until the working pressure has built up. Then return valve 37 is closed and reversing valve 31 is switched in such a way that piston cylinder unit 22 is admitted in the direction of pressing contact of clamping jaws 9, 10, against gate 4. With the opening of reversing valve 32 piston cylinder units 23, 24 are admitted and press clamping jaws 11, 12 at the same time against gate 5. It is only after that, that reversing valve 33 receives the command from control device 19 to admit piston cylinder units 25, 26. By this means clamping jaw 13 is pressed against gate 5. Reversing valve 34 receives the command to open and, by means of piston cylinder units 27, 28 clamping jaws 14, 15 are pressed against gate 5. With a delay of four seconds reversing valve 35 also opens with the result that clamping jaws 16, 17 are pressed against gate 5 by the admission of piston cylinder units 29, 30. Now, by means of a pneumatically controlled device, a ram runs against appropriate points or zones in the mold cavity in order possibly to pull tight any creases which are present in the cover and/or the ram presses the cover in undercuts. Then vacuum source 46 creates a partial vacuum with the result that cover 6 is adapted to the contour of mold cavity 2 completely, in which process a boost is afforded at exposed points such as the corners, manually if necessary. When cover 6 is fixed in mold cavity 2 so that it fits the shape of the latter, control device 29 gives a command to reverse all reversing valves 31, 32, 33, 34, 35, which causes piston cylinder units 22, 23, 24, 25, 26, 27, 28, 29, 30 to be admitted in the opposite direction and which causes the clamping effect of clamping jaws 9, 10, 11, 12, 13, 14, 15, 16, 17 to be cancelled. Clamping device 7 is now removed and a mixing head is positioned over mold cavity 2, which introduces a reaction mixture forming foam and consisting of polyol and isocyanate, onto the reverse side of textile cover 6 into mold cavity 2. Then form tool 1 is immediately closed with a lid and the foam which expands is left to cure. After it has completely cured form tool 1 is opened, the finished product is taken out and form tool 1 is ready for fresh operational cycle.

Although the invention has been described in detail in the foregoing for the purpose of illustration, it is to be understood that such detail is soley for that purpose and that variations can be made therein by those skilled in the art without departing from the spirit and scope of the invention except as it may be limited by the claims.

What is claimed is:

1. A process for the production of foam cushions having textile covers which comprises inserting a textile cover into a mold cavity having gates which project into said mold cavity, initially preforming said textile cover by applying a vacuum through holes in said mold cavity such that said textile cover conforms to the contour on both sides of each of said gates, clamping said textile cover against said gates, further positioning said textile cover such that it conforms to the contours of both said gates and said mold cavity, releasing said clamps and subsequently introducing a foam-forming reaction mixture into said mold cavity and against said textile cover.

2. The process of claim 1 wherein said textile cover is initially clamped to a gate which is centrally located in said mold cavity and then the remaining gates are clamped by progressing in an outward direction towards sides of said mold cavity and applying a vacuum to said cover between each clamping operation.

3. The process of claim 1 wherein said textile cover is initially clamped against one side of a gate and is then clamped against the other side of said gate.

4. The process of claim 2 wherein said textile cover is initially clamped against one side of a gate and is then clamped against the other side of said gate.

* * * * *